United States Patent
Ganguli et al.

(10) Patent No.: US 12,292,842 B2
(45) Date of Patent: May 6, 2025

(54) NETWORK LAYER 7 OFFLOAD TO INFRASTRUCTURE PROCESSING UNIT FOR SERVICE MESH

(71) Applicant: Intel Corporation, Santa Clara, CA (US)

(72) Inventors: Mrittika Ganguli, Tempe, AZ (US); Anjali Jain, Portland, OR (US); Reshma Lal, Portland, OR (US); Edwin Verplanke, Chandler, AZ (US); Priya Autee, Chandler, AZ (US); Chih-Jen Chang, Union City, CA (US); Abhirupa Layek, Chandler, AZ (US); Nupur Jain, Saratoga, CA (US)

(73) Assignee: Intel Corporation, Santa Clara, CA (US)

( * ) Notice: Subject to any disclaimer, the term of this patent is extended or adjusted under 35 U.S.C. 154(b) by 710 days.

(21) Appl. No.: 17/486,579

(22) Filed: Sep. 27, 2021

(65) Prior Publication Data

US 2022/0014459 A1 Jan. 13, 2022

(51) Int. Cl.
*G06F 13/38* (2006.01)
*G06F 13/16* (2006.01)
(Continued)

(52) U.S. Cl.
CPC ...... *G06F 13/1668* (2013.01); *G06F 13/1631* (2013.01); *G06F 13/28* (2013.01);
(Continued)

(58) Field of Classification Search
CPC .. G06F 13/1668; G06F 13/1631; G06F 13/28; H04L 45/02; H04L 45/64; H04L 67/289; H04L 69/321
See application file for complete search history.

(56) References Cited

U.S. PATENT DOCUMENTS 7,715,401 B2 * 5/2010 Yoshimoto .......... H04L 65/1104
370/395.21
7,735,099 B1  6/2010 Micalizzi
(Continued)

FOREIGN PATENT DOCUMENTS

| CN | 117651936 A | 3/2024 |
| DE | 112022002284 T5 | 3/2024 |
| WO | 2023049584 A1 | 3/2023 |

OTHER PUBLICATIONS

International Patent Application No. PCT/US2022/075335, "International Preliminary Report on Patentability" mailed Apr. 11, 2024, 11 pages.
(Continued)

*Primary Examiner* — Cheng Yuan Tseng
(74) *Attorney, Agent, or Firm* — Essential Patents Group, LLP; Christopher K. Gagne

(57) ABSTRACT

Examples described herein relate to network layer 7 (L7) offload to an infrastructure processing unit (IPU) for a service mesh. An apparatus described herein includes an IPU comprising an IPU memory to store a routing table for a service mesh, the routing table to map shared memory address spaces of the IPU and a host device executing one or more microservices, wherein the service mesh provides an infrastructure layer for the one or more microservices executing on the host device; and one or more IPU cores communicably coupled to the IPU memory, the one or more IPU cores to: host a network L7 proxy endpoint for the service mesh, and communicate messages between the network L7 proxy endpoint and an L7 interface device of the one or more microservices by copying data between the shared memory address spaces of the IPU and the host device based on the routing table.

20 Claims, 11 Drawing Sheets

(51) Int. Cl.
*G06F 13/28* (2006.01)
*H04L 45/02* (2022.01)
*H04L 45/64* (2022.01)
*H04L 67/289* (2022.01)
*H04L 69/321* (2022.01)

(52) U.S. Cl.
CPC .............. *H04L 45/02* (2013.01); *H04L 45/64* (2013.01); *H04L 67/289* (2013.01); *H04L 69/321* (2013.01)

(56) References Cited

U.S. PATENT DOCUMENTS

| | | | | |
|---|---|---|---|---|
| 7,840,699 | B2 * | 11/2010 | Fujita | H04L 67/306 709/238 |
| 9,154,457 | B1 * | 10/2015 | Li | H04L 49/65 |
| 10,979,498 | B2 * | 4/2021 | Mendiola | H04L 67/02 |
| 11,246,060 | B2 * | 2/2022 | Kucera | H04W 28/0865 |
| 11,558,426 | B2 * | 1/2023 | Shen | H04L 43/045 |
| 11,570,264 | B1 * | 1/2023 | Poornachandran | H04L 41/5006 |
| 2013/0198332 | A1 * | 8/2013 | Van Ackere | H04L 45/54 709/217 |
| 2016/0359681 | A1 * | 12/2016 | McGleenon | H04L 41/12 |
| 2018/0115524 | A1 * | 4/2018 | Jia | H04L 63/0281 |
| 2019/0141010 | A1 * | 5/2019 | Chander | H04L 12/4645 |
| 2021/0194981 | A1 * | 6/2021 | Power | H04L 67/1014 |
| 2022/0014459 | A1 * | 1/2022 | Ganguli | H04L 45/64 |
| 2022/0109733 | A1 * | 4/2022 | Zhang | H04L 67/148 |
| 2023/0082780 | A1 * | 3/2023 | Sun | G06F 9/505 718/105 |

OTHER PUBLICATIONS

Dave, A. et al "Proxies, application interfaces, and distributed systems", Object Orientation in Operating Systems, 1992., Proceedings of the second international workshop on dourdan, France, Sep. 24-25, 1992, pp. 212-220.

International Patent Application No. PCT/US2022/075335, "International Search Report and Written Opinion" mailed Dec. 21, 2022, 18 pages.

Chinese Patent Application No. 202280046989.2 "Notice of Publication" issued Mar. 5, 2024, 2 pages (with translation).

* cited by examiner

| UUID 410 | XPU Name 420 | Card Address 430 | Card Port 440 |
|---|---|---|---|
| | CRYPTO-FPGA | 200.0.0.1 | 4791 |
| | DPI-FPGA | 200.0.0.1 | 4789 |
| | COMPR-FPGA | 200.0.0.1 | 4781 |
| | | | |

Store, by infrastructure processing unit (IPU), a routing table for a service mesh, the routing table to map shared memory address spaces of the IPU and a host device executing one or more microservices, wherein the service mesh provides an infrastructure layer for the one or more microservices executing on the host device
510

Host, by the IPU, a network layer 7 (L7) proxy endpoint for the service mesh
520

Communicate, by the IPU, messages between the network L7 proxy endpoint and an L7 interface device of the one or more microservices by copying data between the shared memory address spaces of the IPU and the host device based on the routing table
530

Packetize, by the IPU, the data received from the host device by generating one or more headers for the data to be utilized as part of a network packet to transmit using a network interface of the IPU
540

Communicate, by the IPU, messages between a network L7 proxy endpoint and an L7 interface device of one or more microservices by copying, based on a routing table, data between shared memory address spaces of the IPU and a host device hosting the one or more microservices
610

Apply routing rules generated using a programmable language to the data received from the host device
620

Generate, by the IPU based on the applied routing rules, one or more headers to append to the data in order to generate a network packet
630

Transmit the network packet using a network interface of the IPU
640

Receive, by the IPU, a network packet having a destination of a microservice hosted by a host device communicably coupled to the IPU message
660

↓

Apply, by a network L7 proxy endpoint of the IPU, routing rules generated using a programmable language to the network packet
670

↓

Process, by the network L7 proxy endpoint based on the applied routing rules, the network packet to remove one or more headers from the network packet and identify data of the network packet to be transmitted to the microservice on the host device
680

↓

Cause, by the network L7 proxy endpoint based on a routing table, the identified data to be communicated to an L7 interface device associated with the microservice using a shared memory address space of the IPU and the host device
690

FIG. 6B

NETWORK LAYER 7 OFFLOAD TO INFRASTRUCTURE PROCESSING UNIT FOR SERVICE MESH

BACKGROUND

With the onset of cloud computing and big data, system administrators are increasingly turning to microservice architectures for deployment of applications. Microservice architectures arrange an application as a collection of loosely-coupled microservices, which can refer to processes that communicate over a network to fulfill a goal using technology-agnostic protocols, such as Hypertext Transfer Protocol (HTTP) or "g" Remote Procedure Call (gRPC). In some cases, the microservices may be deployed using a container orchestration platform providing containerized workloads and/or services. The container orchestration platform may utilize a service mesh to manage the high volume of network-based inter-process communication among the microservices. The service mesh is a dedicated software infrastructure layer for the microservices that includes elements to enable the communication among the microservices to be fast, reliable, and secure. The service mesh provides capabilities including service discovery, load balancing, encryption, observability, traceability, and authentication and authorization.

However, current service mesh implementations add layers of network services, which can add latency and reduce packet performance over the network. For example, a host server device that is hosting application microservices containers may support the application microservices using a service mesh that implements an ingress proxy and a sidecar proxy to support communications between the application microservices. The ingress proxy and sidecar proxy are software elements of the service mesh that perform network layer 7 (L7) operations for the application microservices and provide a mechanism to manage service level agreement (SLA) telemetry and proxying/routing to the microservice, as well as manage the number of network connections to the microservice and data movement to and from the microservice. The ingress proxy and sidecar proxy are implemented on the user space level of the network stack of the host server device, resulting in additional latency and reduced performance of the CPU cores of the host service device.

BRIEF DESCRIPTION OF THE DRAWINGS

Various embodiments in accordance with the disclosure are described with reference to the drawings, in which:

FIG. 4 illustrates an example table that is implemented as an L7 interface shared memory table, in accordance with embodiments herein.

FIG. 5 is a flow diagram illustrating a method for network L7 offload to an IPU for a service mesh, in accordance with one or more aspects of the embodiments described herein.

FIG. 6A is a flow diagram illustrating a method for communication of a network packet from a microservice using network L7 offload to an IPU for a service mesh, in accordance with one or more aspects of the embodiments described herein.

FIG. 6B is a flow diagram illustrating a method for communication of a network packet to a microservice using network L7 offload to an IPU for a service mesh, in accordance with one or more aspects of the embodiments described herein.

DETAILED DESCRIPTION

Figure 1:
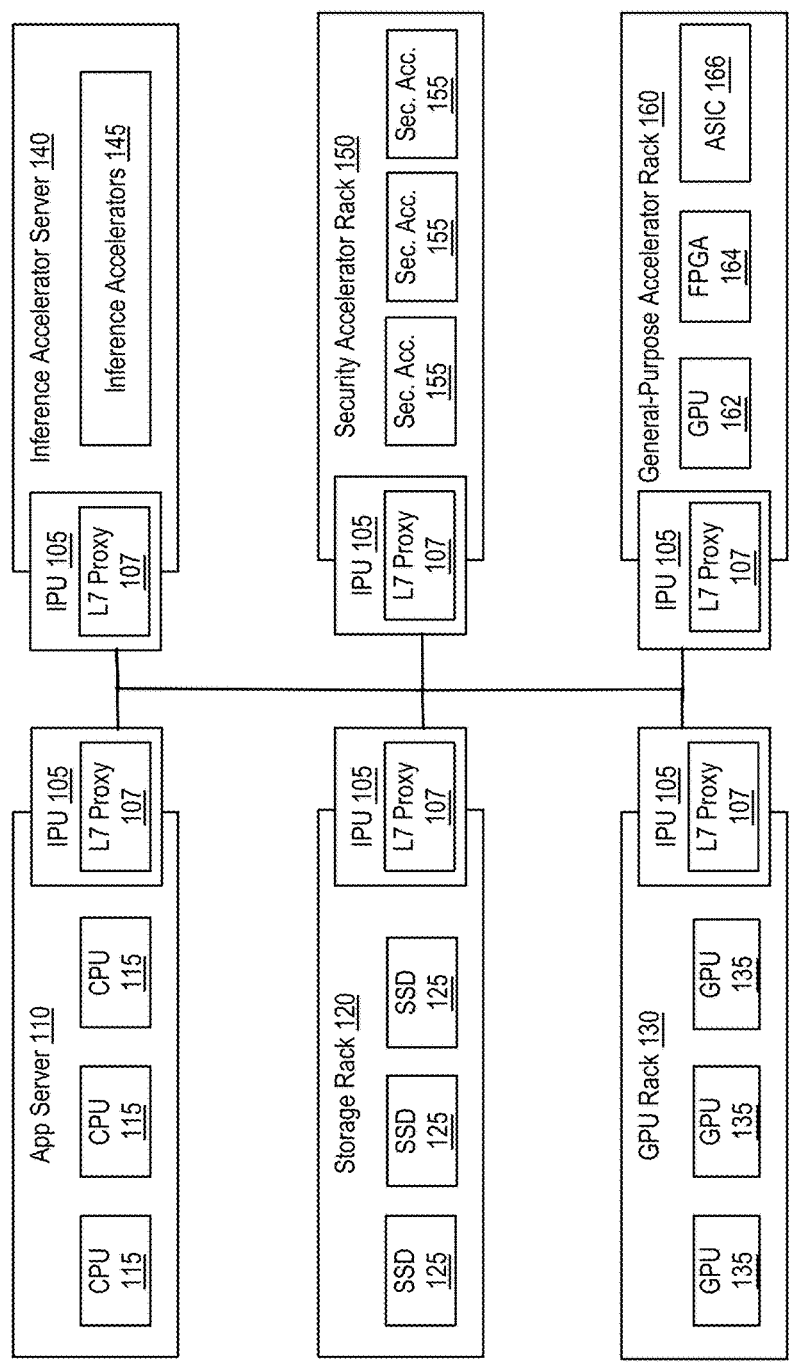
FIG. 1 illustrates a system that provides network layer 7 (L7) offload to an infrastructure processing unit (IPU) for a service mesh, in accordance with implementations of the disclosure.

Various embodiments can provide network layer 7 (L7) offload to an infrastructure processing unit (IPU) for a service mesh. With the onset of cloud computing and big data, system administrators are increasingly turning to microservice architectures for deployment of applications. Microservice architectures arrange an application as a collection of loosely-coupled microservices, which can refer to processes that communicate over a network to fulfill a goal using technology-agnostic protocols, such as Hypertext Transfer Protocol (HTTP) or "g" Remote Procedure Call (gRPC). In some cases, the microservices may be deployed using a container orchestration platform providing containerized workloads and/or services. The container orchestration platforms may utilize a service mesh to manage the high volume of network-based inter-process communication among the microservices. The service mesh is a dedicated software infrastructure layer for the microservices that includes elements to enable the communication among the microservices to be fast, reliable, and secure. The service mesh provides capabilities including service discovery, load balancing, encryption, observability, traceability, and authentication and authorization.

However, conventional service mesh implementations add layers of network services, which can add latency and reduce packet performance over the network. For example, a host server device that is hosting application microservices containers may support the application microservices using a service mesh that implements an ingress proxy and a sidecar proxy to support communications between the application microservices. The ingress proxy and sidecar proxy are software elements of the service mesh that perform network layer 7 (L7) operations for the application microservices and provide a mechanism to manage service level agreement (SLA) telemetry and proxying/routing to the microservice, as well as manage the number of network connections to the microservice and data movement to and from the microservice. The ingress proxy and sidecar proxy are implemented on the user space level of the network stack of the host server device, resulting in additional latency and reduced performance of the CPU cores of the host service device.

Embodiments of the disclosure address the above-noted drawbacks by providing for network L7 offload to an IPU for a service mesh that supports one or more microservices running on a host device. An IPU may refer to a programmable network device that can be utilized to accelerate network infrastructure, freeing up central processing unit (CPU) cores for improved application performance. Programmable network devices may include, for example, IPUs, Data Processing Units (DPUs), or smart network interface cards (SmartNICs), to name some examples. While the discussion herein may specifically refer to programmable network devices as IPUs, it is not intended to limit programmable network devices to such an implementation and embodiments may encompass other implementations of programmable network devices. Programmable network devices, such as IPUs, enable cloud service providers to customize infrastructure function deployments at the speed of software, while improving data center utilization by allowing for flexible workload placement. Programmable network devices can intelligently manage system-level resources by securely accelerating networking and storage infrastructure functions in a data center. Conventional approaches do not allow for installation of an L7 proxy in an IPU due to an inability to utilize existing L2 interfaces in such an approach.

Embodiments herein address the above-noted drawbacks by providing an L7 proxy endpoint operating on an IPU, where the L7 proxy endpoint provides a communication interface (e.g., peripheral component interconnect express (PCIe), compute express link (CXL), etc.) exposing a gRPC or HTTP interface to the microservices. The L7 proxy endpoint can be mapped to a memory area (e.g., on a host device hosting the microservice and/or on the IPU) using modified shared memory addressing. Embodiments herein further provide for accelerated gRPC/HTTP packet processing to strip out data from packets destined for the microservices using programmable language routing rules between IPU IPs (where IPs refer to reusable units of logic for an integrated circuit that may be stored on a tangible, machine-readable medium as a hardware model that describes the structure of the integrated circuit). Embodiments also provide for an L7 interface device(s) hosted on the host device running the microservices. The L7 interface device(s) can communicate messages to and/or from the IPU and performs the above-described data copies to the shared memory area using the modified shared memory addressing. Embodiments also utilize direct memory access (DMA) to copy data between the shared memory area(s) in the IPU and/or host device based on a routing table for the service mesh.

Embodiments of the disclosure for network L7 offload to the IPU provide technical improvements over the conventional approaches (implementing ingress proxies and sidecar proxies on the host device) by removing the utilization of the ingress proxy and sidecar proxy via the user space of the host device. As a result, embodiments herein eliminate at least two hops in a path of the network packet, resulting in improved latency of the network communications, improved application throughput, and improved overall performance of the network stack. Furthermore, utilization of DMA creates a high-speed input/output (I/O) solution also contributing to the improved latency and improved application throughput provided by embodiments herein.

FIG. 1 illustrates a system 100 that provides network L7 offload to an IPU for a service mesh, in accordance with implementations of the disclosure. System 100 illustrates an example data center (for example, hosted by a cloud service provider (CSP)) providing a variety of XPUs for processing tasks at the data center, where an XPU can include one or more of: a central processing unit (CPU) 115, a graphics processing unit (GPU) 135 (including a general purpose GPU (GPGPU), or other processing units (e.g., accelerators 145, 155, 166, inference accelerators 145, security accelerators 155, programmable or fixed function FPGAs 164, application-specific integrated circuit (ASIC) 166). The data center may also provide storage units for data storage tasks, as well. The storage units may include solid state drive (SSD) 125, for example. The XPUs and/or storage units may be hosted with similar-type units (e.g., CPU(s) 115 hosted on an application server 110, SSDs 125 hosted on a storage rack 120, GPUs 135 hosted on a GPU rack 130, inference accelerators 145 hosted on an inference accelerator server 140, security accelerators 155 hosted on a security accelerator rack 150, and general accelerators 162, 164, 166 hosted on accelerator rack 160).

The data center of system 100 provides its hosted processing components 115, 125, 135, 145, 155, 162, 164, 166 with a variety of offloads using IPUs 105 that are directly attached to the respective host processing component. The offloads provided may be networking, storage, security, etc. This allows the processing components 115, 125, 135, 145, 155, 162, 164, 166 to run without a hypervisor, and provides cloud service providers (CSPs) the capability of renting out the entire host in a datacenter to their security-minded customers, or avoid cross-talk and other problems associated with multi-tenant hosts.

An IPU 105 can provide a role in data centers by providing the datacenter operator, such as a CSP, a control point for security, acceleration, telemetry and service orchestration. As previously noted, an IPU may be a programmable network device that can be utilized to accelerate network infrastructure, freeing up CPU cores for improved application performance. Programmable network devices may include, for example, IPUs, DPUs, and SmartNICs, to name a few examples. Although the discussion herein may specifically refer to programmable network devices as IPUs 105, it is not intended to limit programmable network devices to such an implementation and may encompass other implementations of programmable network devices.

IPU 105 architecture may build upon existing SmartNIC features and is a part of controlling security and data acceleration within and across distributed platforms. IPUs 105 may provide a secure domain controlled by CSPs for managing a platform, providing services to tenants, and securing access into the data center network. The IPU 105 increases the performance and predictability for distributed runtimes and enables scaling to multi-terabit throughputs by offloading host services, reliable transport, and optimizing data copies.

IPUs 105 have grown in complexity over the years, starting with foundational NICs, whose sole purpose was to get packets into the host and out of it. With the addition of networking software offload, the NICs evolved to become SmartNICs, that are capable of offloading functions, such as vSwitch, Virtio-net, AVF, etc. Remote disaggregated storage architectures provide a further evolution, where compute and storage are not co-located anymore, but large compute clusters are connected to large storage clusters over the network. Increase in network speeds, and evolution of protocols made this a possibility. One of the advantages that remote disaggregated storage offers over direct attached storage is that compute and memory can be developed and updated at different cadences. The amount of memory that is attached to a compute node is not limited by physical addition or removal of hard-drives anymore, but can be hot-plugged as a PF to a PCIe Switch. Technologies such as Smart End Point enable IPUs to have firmware-controlled switches, along the PCIe Switch itself to not be limited by hardware implementations.

As discussed above, embodiments herein provide for network L7 offload to the IPU 105 for a service mesh that supports one or more microservices running on a host device (e.g., any of the XPUs noted above). Embodiments provide an L7 proxy endpoint, illustrated as L7 proxy 107, operating on the IPU 105, that provides a communication interface (e.g., PCIe, CXL) exposing, for example, a gRPC or HTTP interface to the microservices. The L7 proxy 107 can be mapped to a memory area (e.g., on the host device (CPU 115) and/or on the IPU 105) using modified shared memory addressing. Embodiments herein further provide for accelerated gRPC/HTTP packet processing to strip out data from packets destined for the microservices using a programmable language routing rules between IPU IPs. Embodiments also provide for an L7 interface device(s) (not shown) hosted on the host device running the microservices, where the L7 interface device(s) communicate messages to/from the IPU and utilized for the above-described data copies to the memory are using the modified shared memory addressing. Embodiments also utilize direct memory access (DMA) to copy data between the memory regions in the IPU and CPU based on a routing table for the service mesh.

Figure 2A:
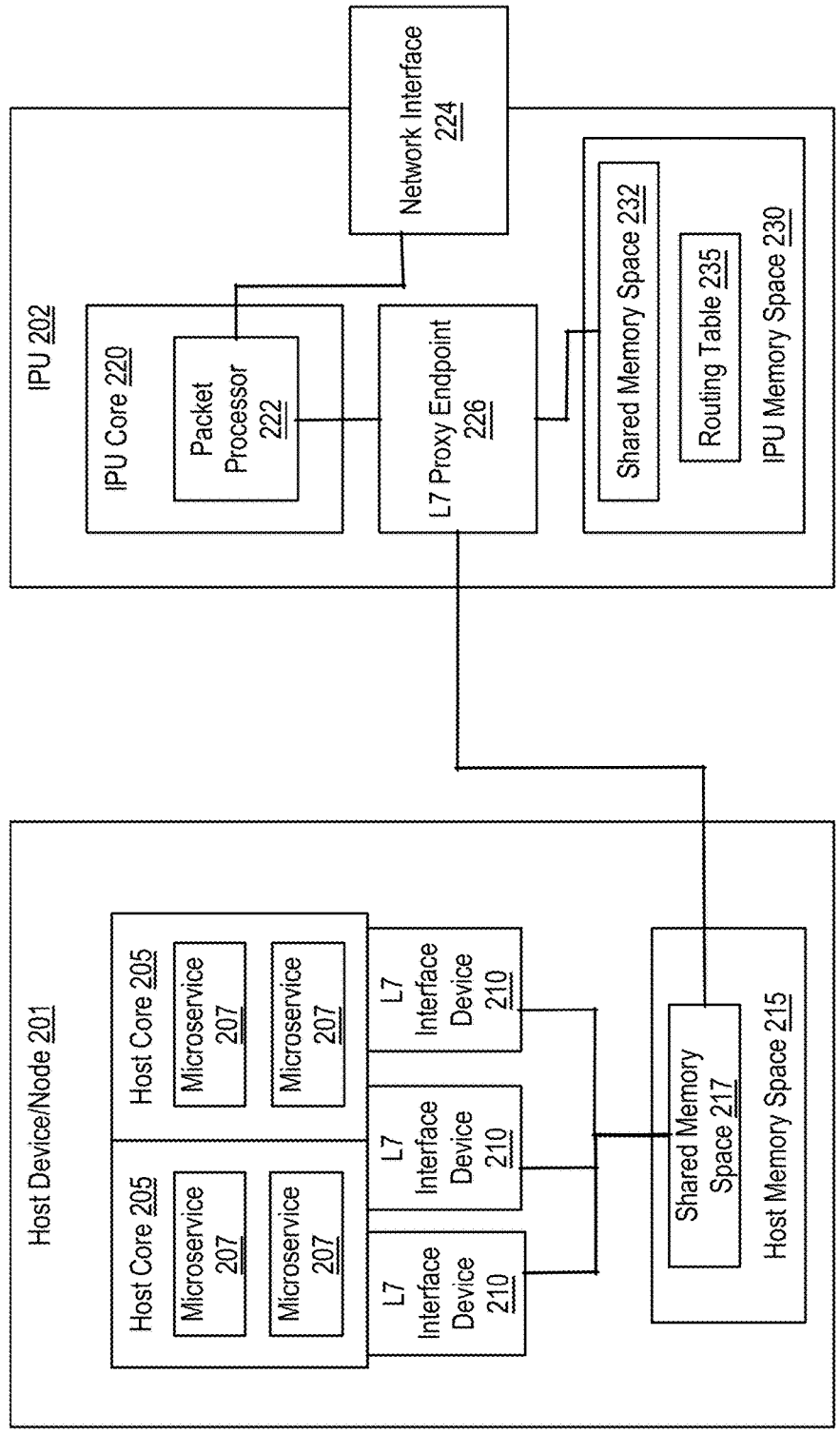
FIG. 2A is a block diagram illustrating a system for network L7 offload for a service mesh to an IPU, in accordance with embodiments herein.

FIG. 2A is a block diagram illustrating a system 200 for network L7 offload for a service mesh to an IPU, in accordance with embodiments herein. System 200 includes a host device 201 (host device 201 may also be referred to as a "node" herein) and an IPU 202 communicably coupled via network (not shown). In one embodiment, the network may include such as a LAN, a wide area network (WAN), a metropolitan area network (MAN), a personal area network (PAN), Bluetooth, a cloud network, a mobile network (e.g., 3rd Generation (3G), 4th Generation (4G), etc.), an intranet, the Internet, etc. Host device 201 may include one or more of a CPU, GPU, accelerator, and so on. For example, host device 201 may be the same as any of CPU 115, GPU 135, inference accelerator 145, security accelerator 155, GPU 162, FPGA 164, or accelerator 166 described with respect to FIG. 1. IPU 202 may be the same as IPU 105 described with respect to FIG. 1.

In one embodiment, host device 201 includes one or more host cores 205 (comprising execution circuitry to execute instructions for host device 201 (may also be referred to herein as processing resources or execution resources) hosting microservices 207, one or more L7 interface devices 210, and a host memory space 215 having shared memory space 217. In one implementation, microservices 207 may be implemented using a container managed by a container orchestration platform. A container may refer to a ready-to-run software package, containing the components utilized to run an application: the code and any runtime it utilizes, application and system libraries, and default values for any determined settings. Containers are similar to virtual machines (VMs), but they have relaxed isolation properties to share the operating system (OS) among the applications. Therefore, containers are considered lightweight. Similar to a VM, a container has its own filesystem, share of CPU, memory, process space, and more. As containers are decoupled from the underlying infrastructure, they are portable across clouds and OS distributions. In some embodiment, the container of the microservice 207 may be part of a pod, which is a group of one or more containers, with shared storage and network resources, and a specification for how to run the containers of the pod.

In one embodiment, IPU 202 includes an IPU core 220, a L7 proxy endpoint 226, IPU memory space 230 having shared memory space 232, and a network interface 224. Network interface(s) 224 may include, for example, a point of interconnection between a computer and a private or public network. In some embodiments, network interface(s) 224 may include a wireless network interface having an antenna, which may represent one or more antenna(s). Network interface(s) may also include, for example, a wired network interface to communicate with remote devices via network cable, which may be, for example, an Ethernet cable, a coaxial cable, a fiber optic cable, a serial cable, or a parallel cable.

As discussed above, embodiments herein provide for network L7 offload to the IPU 202 for a service mesh that supports one or more microservices 207 running on a host device 201 (e.g., any of the XPUs noted above). Embodiments provide an L7 proxy endpoint 226 operating on the IPU 202, that provides a communication interface (e.g., PCIe, CXL) exposing a gRPC/HTTP interface to the microservices 207. The L7 proxy endpoint 226 can be mapped to a shared memory space 217, 232 (e.g., on the host device 201 and/or on the IPU 202) using modified shared memory addressing. Embodiments herein further provide for accelerated gRPC/HTTP packet processing to strip out data from packets destined for the microservices 207 using a programmable language routing rules between IPs of the IPU 202. Embodiments also provide for an L7 interface device(s) 210 hosted on the host device 201 running the microservices 207, where the L7 interface device(s) 210 communicate messages to/from the IPU 202 and are utilized for the above-described data copies to the shared memory space 217, 232 using the modified shared memory addressing techniques. In some embodiments, the L7 interface device 210 may also referred to as a queuedev (QD). Embodiments also utilize DMA to copy data between the shared memory space 217, 232 in the IPU 202 and host device 201 based on a routing table 235 for the service mesh.

In one embodiment, IPU 202 hosts a network L7 proxy endpoint 226 to offload L7 operations for one or more of the microservices 207 running on host device 201 to the IPU 202. In embodiments herein, the L7 proxy endpoint 226 may provide a PCIe or CXL interface exposing a GRPC or HTTP2 interface. This interface is discoverable and configurable, and is mapped to shared memory space 217, 232 using modified shared memory addressing. In some implementations, the interface can be mapped to Scalable I/O virtualization (SIOV) interfaces, for example. In a containerized implementation, the L7 proxy endpoint 226 removes the utilization of ingress proxies and sidecar proxies in the host device 201.

Embodiments also provide for an L7 interface device(s) 210 hosted on the host device 201 running the microservices 207. The L7 interface device(s) 210 communicate data messages to and/or from the IPU 202 by utilizing data copies (e.g., DMA data copies) to the shared memory space 217, 232 using modified shared memory addressing. In some embodiments, a SNAP (packaged application with all dependencies that can run on certain OS distributions) or other runtimes can function as a L7 virtual function (VF) driver for the L7 interface device(s) 210 on the host device 201.

In embodiments herein, the DMA to copy data between the shared memory spaces 217, 232 in the IPU 202 and host device 201 is based on a routing table 235 for the service mesh. The routing table 235 may maintain information mapping the microservices 207 (e.g., a pod and/or container hosting the microservice 207) to a port routing configuration. In some embodiments, routing/port discovery and assignment to the microservice(s) 207 may be accomplished via available ports mod application_id (port). Furthermore, an application programming interface (API) call may generate a list of available ports at the host device 201. FIG. 4 discussed below provides further description of the routing table 235.

In some embodiments, a port to application streaming request can be scaled. A port's throughput capacity can be compared to the requests. In some cases, based on this comparison, a port to L7 interface device mapping can be reconfigured based on a large volume (e.g., exceeding a threshold amount of percentage) of requests on a single port. For example, unary requests can underutilize port capacity. To address this, embodiments herein may dedicate such multiple unary request on a single port for serving multiple applications with similar behavior.

In one embodiment, a PCIe bar address can be used to write configuration registers when establishing routing/port discovery and assignment. For example, for one or more of the applications, the L7 interface device 210 may utilize a PCIe bar address to request MMIO space and the different applications can then write to different offsets. In one embodiment, one or more of the applications can directly write the data at this MMIO region or write a descriptor to point to the source address where this data is written.

Embodiments herein further provide for accelerated gRPC/HTTP packet processing to strip out data from packets destined for the microservices 207 using programmable language routing rules between IPs of the IPU 202. In one embodiment, a zerocopy instruction set architecture can be used for copying between microservices 207 (e.g., copying between containers hosting the microservices 207).

The following description provides an example of the use of the programmable language routing rules using P4-based routing. P4 refers to Programming Protocol-independent Packet Processors, which is a domain specific programming language for expressing how packets are processed by a data plane of a forwarding element, such as a hardware or software switch, network interface card, router, or network appliance.

In one embodiment, a packet processor 222 of the IPU core 220 applies the programmable language routing rules. The packet processor 222 provides hardware offload of a classifier and forwarder. In one embodiment, the IPU core 220 may cause a raw socket (e.g., AF_XDP) of the IPU 202 to be bound to a hardware port of a queue pair (QP) through side band filters. The packet processor 222 may then provide inline filters to be added in hardware as part of transmitting the packet.

In some embodiments, a communication protocol, such as QUIC communication protocol, may be utilized. In the example case of QUIC, a message may include a single content ID, multiple connection IDs, and multiple 5 tuples (e.g., Content network: Content ID, Connection ID)—Microservice). The QUIC service may be the same as a user datagram protocol (UDP) destination port (e.g., listening on the service.). However, the connection is identified by: 5=1 tuple: L4 type+L3 (src/dest)+L4 (src/dest)+Connection ID/flow ID (L3-L7). Moreover, the source IP may change because of mobility of the other end of the connection. The destination IP is equal to the microservice IP (e.g., pod IP).

One example flow for packet processing using network L7 offload to the IPU is as follows:

(1) Client transmits request to server (TCP-IP) (TCP Dest port).

(2) Server microservice application listening on TCP Dest port z (service identifier).

(3) Microservice application selected based on load balancing.

(4) Server responds with a QUIC connection (e.g., application includes QUIC header containing connection ID without any transport).

(5) Enable Answer to Reset (ATR) bit on the QUIC connection packet going out from the server application backend.

(6) This results in ATR component programming a connection filter in the hardware with 3+1 tuple.

(7) The application provides the offset from the beginning of the QUIC header, indicating where the connection ID is (e.g., protocol agnostic; the user-defined field is extracted as part of the match).

In some embodiments, the packet processor 222 may further perform generic tunnel/transport/protocol (connectionless) offload. This offload may be performed by, for example:

(1) Seeding an INT sequence number and location in terms of offset (e.g., (INT) (Protocol unaware Sequence number));

(2) Tx descriptor, Message address, and Message length. (Applications memory space process address space ID (PASID) x); and (3) Queue context for raw socket is equal to the offset of connection ID from the start of message.

The packet processor 222 may further program a transport/message context blob (this is pointing to L3-L4 header) (PASID z). This deals with the first 'n' bytes of the packet. The packet processor 222 does not perform any parsing and has the ability to fix up deep in the packet (e.g., an example is checksum, which can be any place in the packet).

In implementations herein, the packet processor 222 can perform classification and load balancing as part of the network L7 offload to the IPU 202. The following description provides an example process of the packet processor 222 performing classification and load balancing as part of the network L7 offload to the IPU:

(1) Avoid deep parsing by using offset from last L4 leader for connection ID.

(2) 3 PASIDs involved: Application, Transport, and a Smart Endpoint Agent (e.g., IPU virtualization agent).

(3) The association between connection ID and the 4 tuples (e.g., UDP and IP tuples) can be updated for the life of a connection. As such, a transport agent can have the most up-to-date transport header.

(4) Two levels of classification: (a) For the listening port (e.g., hash-based); and (b) sticky 5 tuple to avoid migrating an established connection from one container/pod to another container/pod when the load increases.

(5) In case of a Transport 4 tuple update for the life of a connection, continue to update the Transport Context, which triggers a new FD add-on miss, and the old FD with the old Transport ages out because of no hit.

(6) Intelligent load balancing is performed by monitoring of the load on one or more of the microservices 207 (e.g., container pods) and spawning new ones when the old ones are saturated. This allows the old connections to continue to map to the old pods, while the new connections are added onto the new pods, as follows:

(a) Load balancing can be a combination of hash (e.g., Proactive Dumb LB) plus NAT, exact match (reactive and more precise), packet mod for NAT utilizes second pass, and exact match on the second pass.

(b) WCM+RC or LPM+RC (this refers to an Iptables use case, with rules programmed by software), Packet modification. (NAT or HA Proxy Mac address update.)

(c) In order to have the WCM+RC or LPM+RC, include entries that are preprogrammed but enabled at run time and utilize Epoch mechanism when combining the match in the first pass in the Exact Match.

(7) Transport SW to initially provide the offset from L4 to point to connection ID. (w.f., Dynamic P4, Add Bfrt API for updating the Input set after the Dataplane Tables are setup.) For example, Source Ip+Dest Ip+Source Port+Dest Port; Update match for a table; Source IP+Dest IP+Source Port+ Dest Port+2 bytes from offset X starting from L4 header; update_match (Table ID, array_of_fields).

Figure 2B:
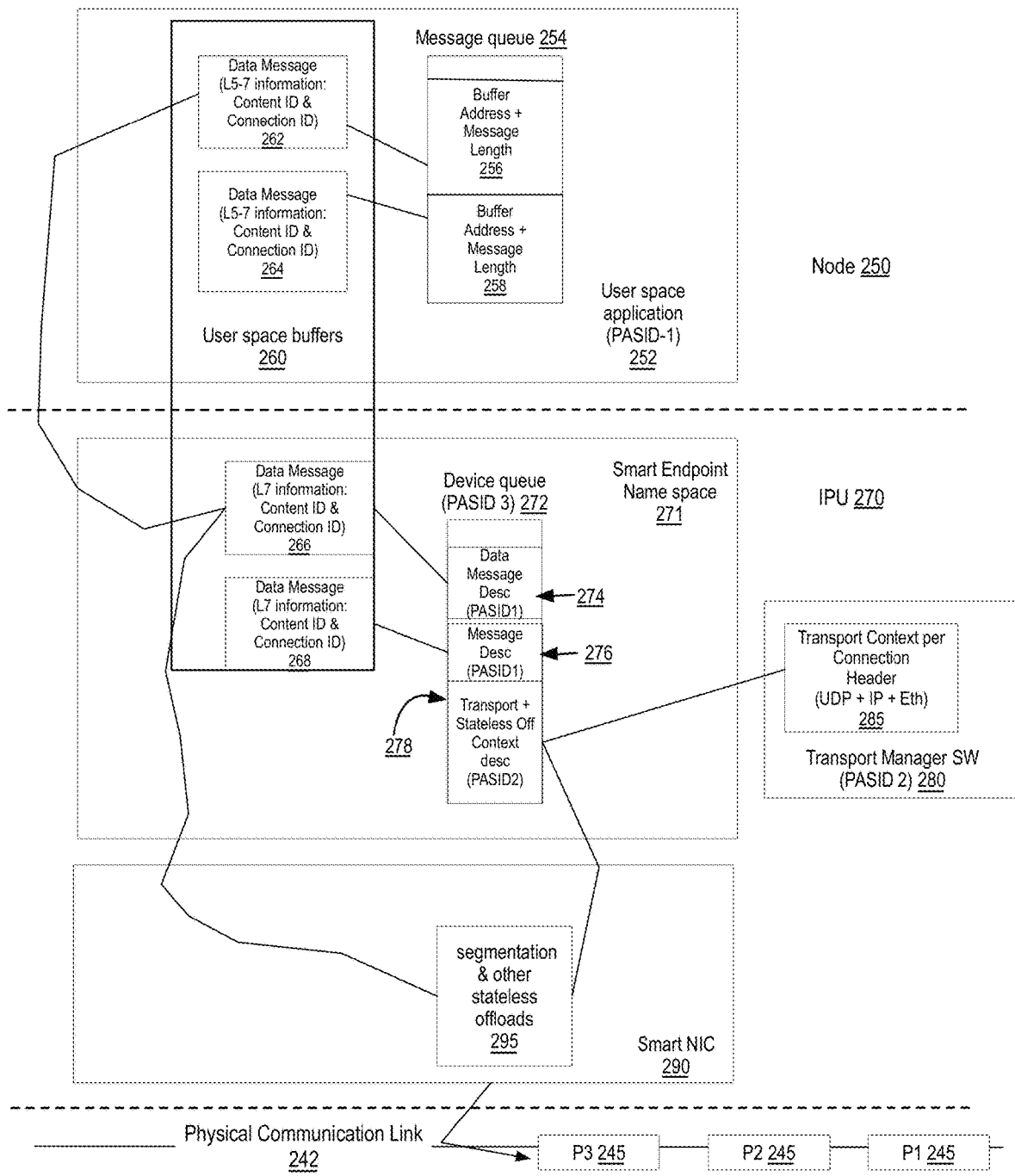
FIG. 2B is a block diagram of a system implementing packetization using network L7 offload for a service mesh to an IPU, in accordance with embodiments herein.

FIG. 2B is a block diagram of a system 240 implementing packetization using network L7 offload for a service mesh to an IPU, in accordance with embodiments herein. In one embodiment, system 240 is the same as system 200 described with respect to FIG. 2A. As illustrated, system 240 includes a node 250 communicably coupled to an IPU 270 having a physical communication link 242 to transmit and receive packets (e.g., P1, P2, P3) 245. In one embodiment, node 250 is the same as host device 201 of FIG. 2A, and IPU 270 is the same as IPU 202 of FIG. 2A.

System 240 illustrates the example utilization of process address space IDs (PASIDs) to enable the network L7 offload for a service mesh via an IPU 270, as described herein. PASIDs are a PCIe-defined transaction layer packet (TLP) prefix. PASIDs are a feature that enables sharing of a single endpoint device across multiple processes while providing the process a complete (e.g., 64-bit) address space.

As shown in system 240, node 250 includes a user space application 252 associated with PASID-1. In some embodiments, the user space application 252 may correspond to a pod and/or microservice container hosting components of the application. The user space application (PASID-1) 252 is associated with a corresponding message queue 254 and user space buffer 260. The user space buffer 260 is shared with the IPU 270 using a shared memory location via CXL or some other transport protocol. This shared user space buffer 260 allows for data message information passing between the node 250 and IPU 270. When the application (e.g., user space application 252) passes data message information it adds the data message(s) to the message queue 254 as buffer address+message length 256, 258. The data in message queue 254 is then stored to user space buffers 260 as a data message 262, 264, respectively. Data messages 264, 266 include the information from the message queue plus L5-L7 information including a content ID and a connection ID.

Using the shared memory location of the user space buffers 260, a smart endpoint namespace of the IPU 270 maintains a device queue 272 and also accesses the shared memory space of the user space buffers 260. The smart endpoint name space 271 uses IPU memory to create the device queue 272. IPU 270 can access the data message 262, 264 from user space application 252 in the user space buffer 260 as data messages 266, 268, respectively, containing L7 information of the content ID and connection ID. The data messages can be posted with PASID-1 in the device queue 272 as data messages 274, 276.

A transport manager (PASID 2) 280 of the IPU 270 can post the data messages 266, 268 from the user space buffers 260 to a smart NIC 290 component of the IPU 290 and indicate a transport context per connection header 285, 278 that should be utilized. The transport manager 280 is aware of the transport based on a connection setup process (e.g., managed by a service manager of the transport manager 280. In some embodiments, the transport header can be updated based on changes from a load balancer, for example. The smart NIC 290 applies segmentation and other stateless offloads 295 in order to post the data messages, now packetized with the transport header and other information, to the physical communication link 242 as one or more packets 245.

Figure 3A:
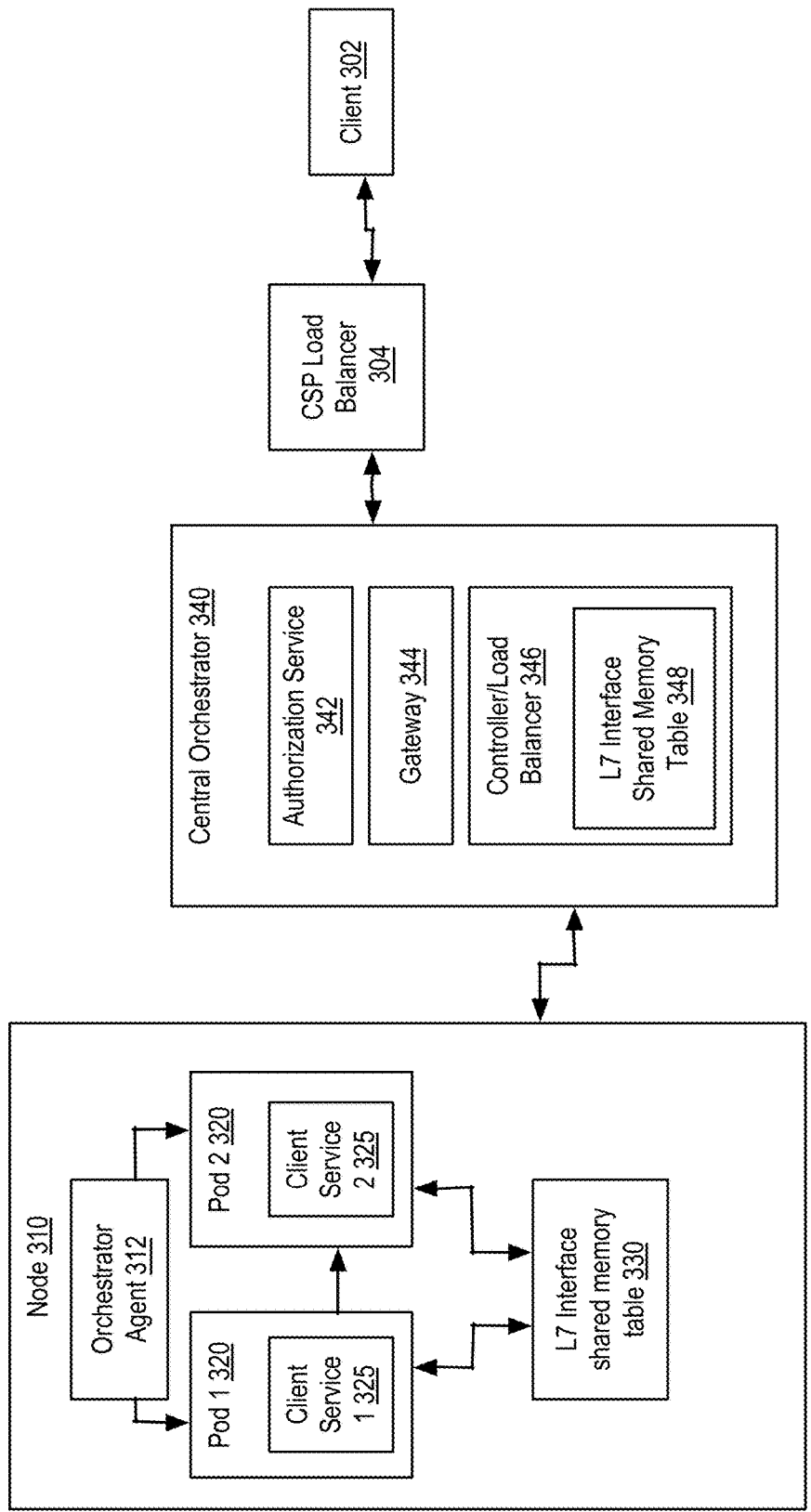
FIG. 3A is a block diagram illustrating a system utilizing a shared memory infrastructure as part of network L7 offload to an IPU, in accordance with embodiments herein.
Figure 3B:
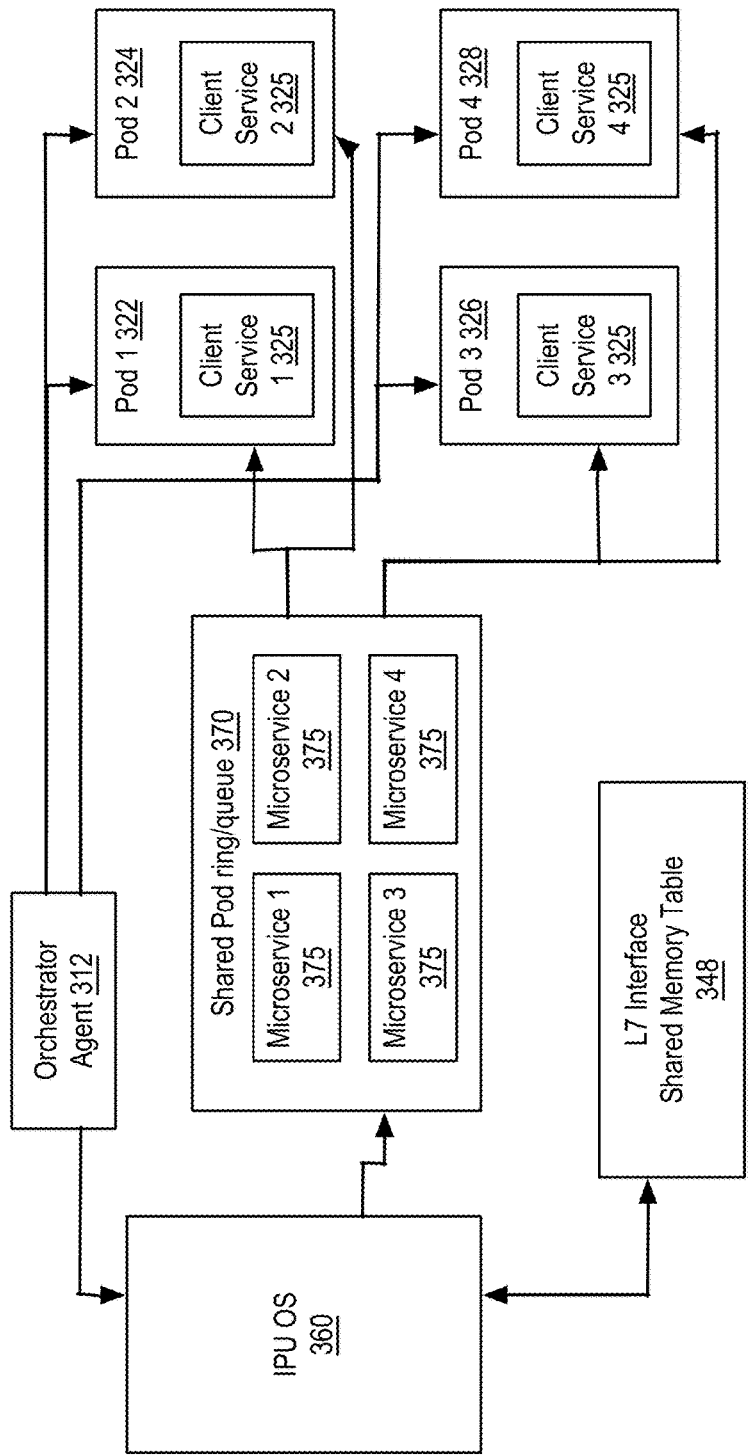
FIG. 3B is a block diagram illustrating a schematic illustrating a network communication flow using a shared memory infrastructure as part of network L7 offload to an IPU, in accordance with embodiments herein.

FIGS. 3A and 3B illustrate block diagrams detailing network communication flows utilizing a shared memory infrastructure as part of a network L7 offload to a programmable network device (such as an IPU), in accordance with embodiments herein. FIG. 3A is a block diagram illustrating a system 300 utilizing a shared memory infrastructure as part of network L7 offload to an IPU, in accordance with embodiments herein. FIG. 3B is a block diagram illustrating a schematic 350 illustrating a network communication flow using a shared memory infrastructure as part of network L7 offload to an IPU, in accordance with embodiments herein.

With respect to FIG. 3A, system 300 includes a node 310, central orchestrator 340, CSP load balancer 304, and a client 302 (e.g., client computing device), each communicably coupled to one another via a network (not shown). In one embodiment, node 310 may the same as host device 201 described with respect to FIG. 2A.

Although not specifically illustrated, the components shown in FIG. 3A may be operating on one or more different computing devices. For example, node 310 may operate separately from central orchestrator 340, which operates separately from CSP load balancer 204, which operates separately from client 302. In some embodiments, one or more components of FIG. 3A may operate on the same computing device, such as CSP load balancer 304 and central orchestrator 340.

In one embodiment, a client request (e.g., to access services provided by client service 1 325 or client service 2 325) may be transmitted by client 302 to the CSP load balancer 304 (at a CSP server device). Client 302 may include any computing device capable of transmitting application service requests via a network to a CSP. CSP load balancer 304 can process the request and forward it on to the central orchestrator 340.

Central orchestrator 340 may deploy, manage, and maintain microservices (such as client services 1 and 2 325) for one or more applications on one or more nodes, such as node 310. Central orchestrator 340 may be hosted on one or more computing devices, such as server devices hosted by the CSP. Central orchestrator may include, but is not limited to, an authorization service 342, gateway 344, and/or a controller/load balancer 346. In one embodiment, the controller/ load balancer 346 hosts an L7 interface shared memory table 348 for use in network L7 offload to an IPU for a service mesh, as described herein. The central orchestrator 340 determines, using topology managers and/or resource managers, which node 310 and pod 320 a client service 325 that should service the request is located.

In embodiments herein, the controller/load balancer 346 of central orchestrator 340 utilizes the L7 interface shared memory table 348 as part of the determination of the location of the client service 325 that can service the request from client 302. For example, the controller/load balancer 346 may maintain a copy of the memory mappings that is also located at the node 310 (e.g., L7 interface shared memory table 330 at node 310) for purposes of implementing load balancing. In this case, the copy of the memory mappings maintained at the controller/load balancer 346 is illustrated as L7 interface shared memory table 348 in FIG. 3A. In one example embodiment, the controller/load balancer 346 utilizes the L7 interface shared memory table 348 for SIOV vfio port to service mappings as part of the L7 protocol utilizing gRPC (e.g., Protobuf) over QUIC or UDP as a transport protocol.

As shown node 310 may include an orchestrator agent 312, pods 1 and 2 320, and an L7 interface shared memory table 330. The orchestrator agent 312 may be an agent working in tandem with the central orchestrator 340 to enable the deployment and management of pods 320 and client services 325 on node 310. The pods 320 may be a group of one or more containers, with shared storage and network resources, and a specification for how to run the containers of the pod. The node 310 also maintains a copy of the L7 interface shared memory table 330 which, in some embodiments, is the same table 348 maintained in the central orchestrator 340.

FIG. 4 illustrates an example table 400 that is implemented as an L7 interface shared memory table, in accordance with embodiments of the disclosure. In one embodiment, table 400 is the same as L7 interface shared memory table 330 and/or L7 interface shared memory table 348 described with respect to FIG. 3A. In some embodiments, table 400 is the same as routing table 235 described with respect to FIG. 2A. Table 400 may be implemented as a data structure in an IPU, host device, or any other computing device described herein. As illustrated, table 400 includes a universally unique identifier (UUID) 410 associated with a microservice hosted on a host device, an XPU name 420 (optional) hosting the microservice, a card address 430 on the XPU for the microservice, and a card port 440 for the microservice. In one implementation, the UUID 410 for the microservice may refer to a shared memory address associated with the microservice that is accessible via DMA for purposes of transmitting messages/data to and from the microservice in accordance with embodiments herein. Other entries for the table 400 are possible in embodiments herein and not limited to solely those illustrated in table 400.

Referring back to FIG. 3A, system 300 depicts how layer 5 (L5) and layer 6 (L6) interfaces of the network stack can utilize the shared memory infrastructure and routing table (e.g., L7 interface shared memory table 330, 348) to map various microservices (e.g., client services 1 and 2 325) for L7 offload to an L7 proxy endpoint of an IPU. In one embodiment, the table 330, 348 can be leveraged by the client services 325 to allow the client services 325 to be aware of other accelerators are available for processing work of the client services 325.

In embodiments herein, the microservice(s) (e.g., client services 325) that are hosted in node 310 may be associated with an entry in table 330, 348. In this way, table 330, 348 provides identifiers to the client services 325 in the table 330, 348, where the identifiers are associated with a shared memory space assigned to the client service 325 in a shared memory infrastructure. The the client service 325 can then be invoked via the shared memory infrastructure. In one embodiment, the client service 325 would have an entitlement in terms of a card address and card port that they are communicating on.

Referring to FIG. 3B, schematic 350 illustrates a network communication flow using a shared memory infrastructure as part of network L7 offload to an IPU, in accordance with embodiments herein. Schematic 350 includes an IPU OS 360, orchestrator agent 312, L7 interface shared memory table 348, shared POD ring queue 370, and multiple pods including pod 1 322, pod 2 324, pod 3, 326, and pod 4 328. Pods 322-328 are shown as hosting client services 1-4 325. In one embodiment, some elements from FIG. 3A are depicted in schematic 350 and their description similarly applies with respect to FIG. 3B. Although not specifically illustrated, the components shown in FIG. 3B may be operating on one or more of an IPU (such as IPU 202 described with respect to FIG. 2A) and a node (such as host device 201 described with respect to FIG. 2A or node 310 described with respect to FIG. 3A). In one example embodiment, pods 1-4 322-328 and shared pod ring/queue 370 may reside on a node, such as host device 201 described with respect to FIG. 2A or node 310 described with respect to FIG. 3A. IPU OS 360, L7 interface shared memory table 348, and/or orchestrator agent 312 may reside on an IPU, such as IPU 202 described with respect to FIG. 2A.

The IPU OS 360 may host service mesh components for the clients services 325, including a control plane, data plane, and the service-to-memory interface address mapping. These component of the IPU OS 360 can leverage an L5-to-L6 interface that includes the L7 interface shared memory table 348. In some embodiments, this infrastructure can be utilized to enable inter-pod 322-328 communications and/or can be utilized to route the requests that come along with these pods 322-328.

The shared pod ring/queue 370 may be data structure that it utilized to determine which microservices 375 go to which client services 325 on the pods 322-328. The shared pod ring/queue 370 provides a space for microservices to operate within that queue and ring format. In one embodiment, the shared pod ring/queue 370 is a data structure maintaining dedicated data storage for the microservices 375 corresponding to the client services 325 provided by pods 1-4 322-328. The shared pod ring/queue 370 data structure enables access to the shared memory referenced by L7 interface shared memory table 348 by the client services 325 executing in pods 322-328. In one embodiment, communication interfaces, such as remote procedure call (RPC)/gRPC can be extended in order to populate the L7 interface shared memory table 348.

FIG. 5 is a flow diagram illustrating a method 500 for network L7 offload to an IPU for a service mesh, in accordance with one or more aspects of the embodiments described herein. Method 500 may be performed by processing logic that may comprise hardware (e.g., circuitry, dedicated logic, programmable logic, etc.), software (such as instructions run on a processing device), or a combination thereof. More particularly, the method 500 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

The process of method 500 is illustrated in linear sequences for brevity and clarity in presentation; however, it is contemplated that any number of them can be performed in parallel, asynchronously, or in different orders. Further, for brevity, clarity, and ease of understanding, many of the components and processes described with respect to FIGS. 1-4 may not be repeated or discussed hereafter. In one implementation, an IPU, such as IPU 202 described with respect to FIG. 2A, may perform method 500.

Method 500 begins at block 510 where an IPU stores a routing table for a service mesh. In one embodiment, the routing table can map shared memory address spaces of the IPU and a host device executing one or more microservices. In some embodiments, the service mesh provides an infrastructure layer for the one or more microservices executing on the host device. At block 520, the IPU hosts a network layer 7 (L7) proxy endpoint for the service mesh.

Subsequently, at block 530, the communicates messages between the network L7 proxy endpoint and an L7 interface device of the one or more microservices. In one embodiment, the messages are communicated by copying data between the shared memory address spaces of the IPU and the host device based on the routing table. Lastly, at block 540, the IPU packetizes the data received from the host device by generating one or more headers for the data to be utilized as part of a network packet to transmit using a network interface of the IPU.

FIG. 6A is a flow diagram illustrating a method 600 for communication of a network packet from a microservice using network L7 offload to an IPU for a service mesh, in accordance with one or more aspects of the embodiments described herein. Method 600 may be performed by processing logic that may comprise hardware (e.g., circuitry, dedicated logic, programmable logic, etc.), software (such as instructions run on a processing device), or a combination thereof. More particularly, the method 600 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

The process of method 600 is illustrated in linear sequences for brevity and clarity in presentation; however, it is contemplated that any number of them can be performed in parallel, asynchronously, or in different orders. Further, for brevity, clarity, and ease of understanding, many of the components and processes described with respect to FIGS. 1-5 may not be repeated or discussed hereafter. In one implementation, an IPU, such as IPU 202 described with respect to FIG. 2A, may perform method 600.

Method 600 begins at block 610 where an IPU communicates messages between a network L7 proxy endpoint and an L7 interface device of one or more microservices by copying data between shared memory address spaces of the IPU and the host device. In one implementation, the messages are copied based on a routing table that maps shared memory address spaces of the IPU and the host device executing one or more microservices. At block 620, the IPU applies routing rules generated using a programmable language to the data received from the host device.

Subsequently, at block 630, the IPU generates, based on the applied routing rules, one or more headers to append to the data in order to generate a network packet. Lastly, at block 640, the IPU transmits the network packet using a network interface of the IPU.

FIG. 6B is a flow diagram illustrating a method 650 for communication of a network packet to a microservice using network L7 offload to an IPU for a service mesh, in accordance with one or more aspects of the embodiments described herein. Method 650 may be performed by processing logic that may comprise hardware (e.g., circuitry, dedicated logic, programmable logic, etc.), software (such as instructions run on a processing device), or a combination thereof. More particularly, the method 650 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

The process of method 650 is illustrated in linear sequences for brevity and clarity in presentation; however, it is contemplated that any number of them can be performed in parallel, asynchronously, or in different orders. Further, for brevity, clarity, and ease of understanding, many of the components and processes described with respect to FIGS. 1-6A may not be repeated or discussed hereafter. In one implementation, an IPU, such as IPU 202 described with respect to FIG. 2A, may perform method 650.

Method 650 begins at block 660 where an IPU receives a network packet having a destination of a microservice, where the microservice is hosted by a host device communicably coupled to the IPU message. Then, at block 670, the IPU applies, by a network L7 proxy endpoint of the IPU, routing rules generated using a programmable language to the network packet.

Subsequently, at block 680, the IPU processes, by the network L7 proxy endpoint based on the applied routing rules, the network packet to remove one or more headers from the network packet and identify data of the network packet to be transmitted to the microservice on the host device. Lastly, at block 690, the IPU causes, by the network L7 proxy endpoint based on a routing table, the identified data to be communicated to an L7 interface device associated with the microservice using a shared memory address space of the IPU and the host device.

Figure 7:
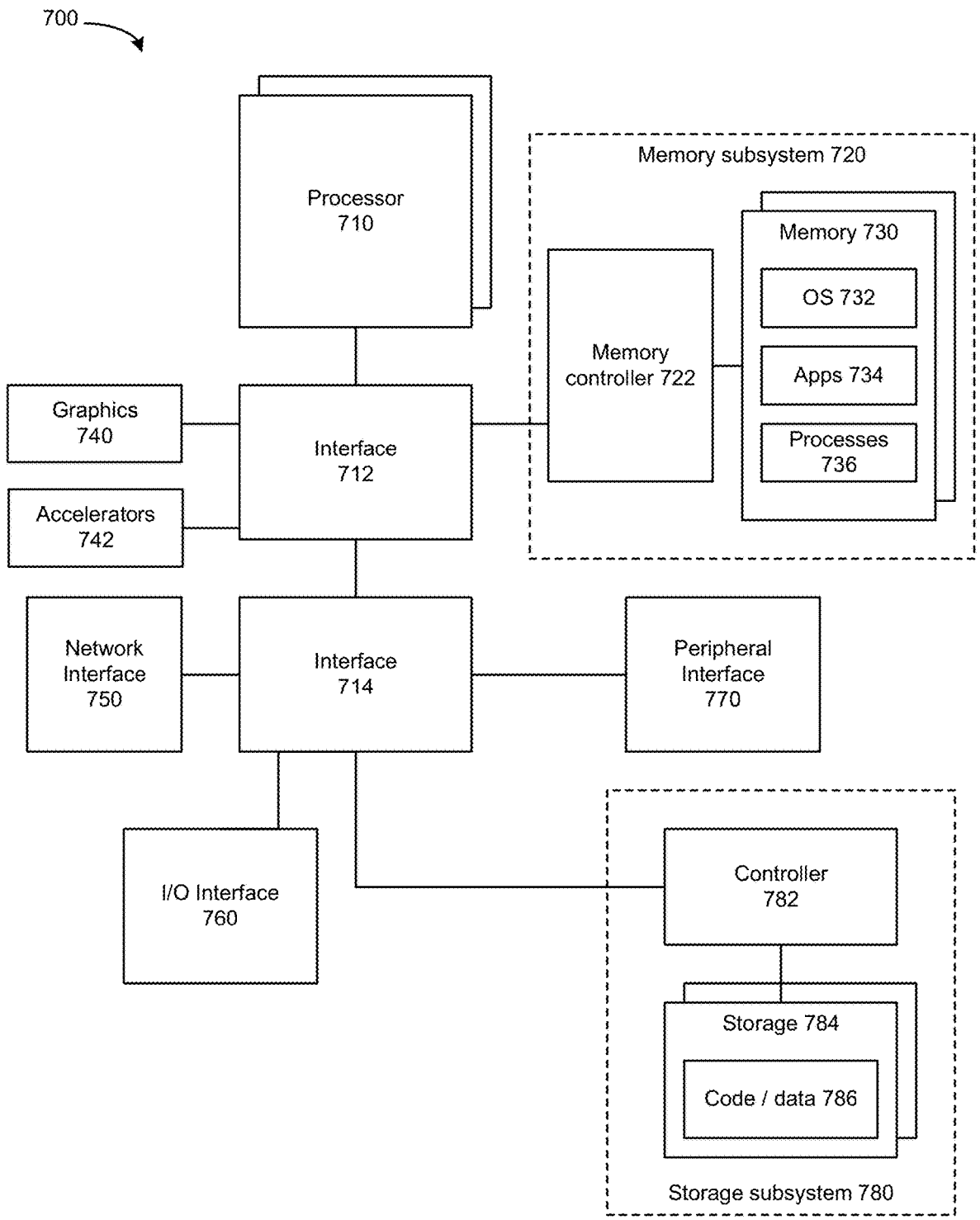
FIG. 7 depicts an example system, in accordance with one or more aspects of the embodiments described herein.

FIG. 7 depicts an example system in accordance with embodiments herein. Various embodiments can be used by system 700 to provide processors with access to memory devices or storage devices using a memory hub. System 700 includes processor 710, which provides processing, operation management, and execution of instructions for system 700. Processor 710 can include any type of microprocessor, central processing unit (CPU), graphics processing unit (GPU), processing core, or other processing hardware to provide processing for system 700, or a combination of processors. Processor 710 controls the overall operation of system 700, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, system 700 includes interface 712 coupled to processor 710, which can represent a higher speed interface or a high throughput interface for system components that uses higher bandwidth connections, such as memory subsystem 720 or graphics interface components 740, or accelerators 742. Interface 712 represents an interface circuit, which can be a standalone component or integrated onto a processor die. Where present, graphics interface 740 interfaces to graphics components for providing a visual display to a user of system 700. In one example, graphics interface 740 can drive a high definition (HD) display that provides an output to a user. High definition can refer to a display having a pixel density of approximately 100 PPI (pixels per inch) or greater and can include formats such as full HD (e.g., 1080p), retina displays, 4K (ultra-high definition or UHD), or others. In one example, the display can include a touchscreen display. In one example, graphics interface 740 generates a display based on data stored in memory 730 or based on operations executed by processor 710 or both. In one example, graphics interface 740 generates a display based on data stored in memory 730 or based on operations executed by processor 710 or both.

Accelerators 742 can be fixed function and/or programmable offload engines that can be accessed or used by a processor 710. For example, an accelerator among accelerators 742 can provide compression (DC) capability, cryptography services such as public key encryption (PKE), cipher, hash/authentication capabilities, decryption, or other capabilities or services. In some embodiments, in addition or alternatively, an accelerator among accelerators 742 provides field select controller capabilities as described herein. In some cases, accelerators 742 can be integrated into a CPU socket (e.g., a connector to a motherboard or circuit board that includes a CPU and provides an electrical interface with the CPU). For example, accelerators 742 can include a single or multi-core processor, graphics processing unit, logical execution unit single or multi-level cache, functional units usable to independently execute programs or threads, application specific integrated circuits (ASICs), neural network processors (NNPs), programmable control logic, and programmable processing elements such as field programmable gate arrays (FPGAs). Accelerators 742 can provide multiple neural networks, CPUs, processor cores, general purpose graphics processing units, or graphics processing units can be made available for use by artificial intelligence (AI) or machine learning (ML) models. For example, the AI model can use or include any or a combination of: a reinforcement learning scheme, Q-learning scheme, deep-Q learning, or Asynchronous Advantage Actor-Critic (A3C), combinatorial neural network, recurrent combinatorial neural network, or other AI or ML model. Multiple neural networks, processor cores, or graphics processing units can be made available for use by AI or ML models.

Memory subsystem 720 represents the main memory of system 700 and provides storage for code to be executed by processor 710, or data values to be used in executing a routine. Memory subsystem 720 can include one or more memory devices 730, such as read-only memory (ROM), flash memory, one or more varieties of random access memory (RAM) such as DRAM, or other memory devices, or a combination of such devices. Memory 730 stores and hosts, among other things, operating system (OS) 732 to provide a software platform for execution of instructions in system 700. Additionally, applications 734 can execute on the software platform of OS 732 from memory 730. Applications 734 represent programs that have their own operational logic to perform execution of one or more functions. Processes 736 represent agents or routines that provide auxiliary functions to OS 732 or one or more applications 734 or a combination. OS 732, applications 734, and processes 736 provide software logic to provide functions for system 700. In one example, memory subsystem 720 includes memory controller 722, which is a memory controller to generate and issue commands to memory 730. It can be understood that memory controller 722 could be a physical part of processor 710 or a physical part of interface 712. For example, memory controller 722 can be an integrated memory controller, integrated onto a circuit with processor 710.

In some examples, instead of or in addition to use of memory controller 722, interface 712 can issue a memory access request or data consistency request to a memory hub and the memory hub can perform the memory access request or data consistency request on behalf of system 700.

While not specifically illustrated, it can be understood that system 700 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a Hyper Transport or industry standard architecture (ISA) bus, a small computer system interface (SCSI) bus, a universal serial bus (USB), or an Institute of Electrical and Electronics Engineers (IEEE) standard 1394 bus (Firewire).

In one example, system 700 includes interface 714, which can be coupled to interface 712. In one example, interface 714 represents an interface circuit, which can include stand-alone components and integrated circuitry. In one example, multiple user interface components or peripheral components, or both, couple to interface 714. Network interface 750 provides system 700 the ability to communicate with remote devices (e.g., servers or other computing devices) over one or more networks. Network interface 750 can include an Ethernet adapter, wireless interconnection components, cellular network interconnection components, USB (universal serial bus), or other wired or wireless standards-based or proprietary interfaces. Network interface 750 can transmit data to a device that is in the same data center or rack or a remote device, which can include sending data stored in memory. Network interface 750 can receive data from a remote device, which can include storing received data into memory. Various embodiments can be used in connection with network interface 750, processor 710, and memory subsystem 720.

Some examples of network interface 750 include being part of an Infrastructure Processing Unit (IPU) or data processing unit (DPU) or being utilized by an IPU or DPU. An IPU or DPU can include a network interface with one or more programmable or fixed function processors to perform offload of operations that could have been performed by a CPU. The IPU or DPU can include one or more memory devices. In some examples, the IPU or DPU can perform virtual switch operations, manage storage transactions (e.g., compression, cryptography, virtualization), and manage operations performed on other IPUs, DPUs, servers, or devices.

In one example, system 700 includes one or more input/output (I/O) interface(s) 760. I/O interface 760 can include one or more interface components through which a user interacts with system 700 (e.g., audio, alphanumeric, tactile/touch, or other interfacing). Peripheral interface 770 can include any hardware interface not specifically mentioned above. Peripherals refer generally to devices that connect dependently to system 700. A dependent connection is one where system 700 provides the software platform or hardware platform or both on which operation executes, and with which a user interacts.

In one example, system 700 includes storage subsystem 780 to store data in a nonvolatile manner. In one example, in certain system implementations, at least certain components of storage 780 can overlap with components of memory subsystem 720. Storage subsystem 780 includes storage device(s) 784 (also referred to herein as storage 784), which can be or include any conventional medium for storing large amounts of data in a nonvolatile manner, such as one or more magnetic, solid state, or optical based disks, or a combination. Storage 784 holds code or instructions and data 786 in a persistent state (e.g., the value is retained despite interruption of power to system 700). Storage 784 can be generically considered to be a "memory," although memory 730 is typically the executing or operating memory to provide instructions to processor 710. Whereas storage 784 is nonvolatile, memory 730 can include volatile memory (e.g., the value or state of the data is indeterminate if power is interrupted to system 700). In one example, storage subsystem 780 includes controller 782 to interface with storage 784. In one example controller 782 is a physical part of interface 714 or processor 710 or can include circuits or logic in both processor 710 and interface 714. Various embodiments can use a memory hub to access volatile or non-volatile memory devices.

A volatile memory device includes a memory whose state (and therefore the data stored in it) is indeterminate if power is interrupted to the device. Dynamic volatile memory utilizes a process for refreshing the data stored in the device to maintain state. One example of dynamic volatile memory incudes DRAM (Dynamic Random Access Memory), or some variant such as Synchronous DRAM (SDRAM). A memory subsystem as described herein can be compatible with a number of memory technologies, such as DDR3 (Double Data Rate version 3, original release by JEDEC (Joint Electronic Device Engineering Council) on Jun. 27, 2007). DDR4 (DDR version 4, initial specification published in September 2012 by JEDEC), DDR4E (DDR version 4), LPDDR3 (Low Power DDR version3, JESD209-3B, August 2013 by JEDEC), LPDDR4) LPDDR version 4, JESD209-4, originally published by JEDEC in August 2014), WIO2 (Wide Input/Output version 2, JESD229-2 originally published by JEDEC in August 2014, HBM (High Bandwidth Memory, JESD325, originally published by JEDEC in October 2013, DDR5 (DDR version 5, currently in discussion by JEDEC), LPDDR5 (currently in discussion by JEDEC), HBM2 (HBM version 2), currently in discussion by JEDEC, or others or combinations of memory technologies, and technologies based on derivatives or extensions of such specifications.

A non-volatile memory (NVM) device is a memory whose state is determinate even if power is interrupted to the device. In one embodiment, the NVM device can comprise a block addressable memory device, such as NAND technologies, or more specifically, multi-threshold level NAND flash memory (for example, Single-Level Cell ("SLC"), Multi-Level Cell ("MLC"), Tri-Level Cell ("TLC"), Quad-Level Cell ("QLC"), Penta-Level Cell (PLC) or some other NAND). A NVM device can also include a byte-addressable write-in-place three dimensional crosspoint memory device, or other byte addressable write-in-place NVM devices (also referred to as persistent memory), such as single or multi-level Phase Change Memory (PCM) or phase change memory with a switch (PCMS), NVM devices that use chalcogenide phase change material (for example, chalcogenide glass), resistive memory including metal oxide base, oxygen vacancy base and Conductive Bridge Random Access Memory (CB-RAM), nanowire memory, ferroelectric random access memory (FeRAM, FRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

A power source (not depicted) provides power to the components of system 700. More specifically, power source typically interfaces to one or multiple power supplies in system 700 to provide power to the components of system 700. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

In an example, system 700 can be implemented using interconnected compute systems of processors, memories, storages, network interfaces, and other components. High speed interconnects can be used to access devices such as: Ethernet (IEEE 802.3), remote direct memory access (RDMA), InfiniBand, Internet Wide Area RDMA Protocol (iWARP), Transmission Control Protocol (TCP), User Datagram Protocol (UDP), quick UDP Internet Connections (QUIC), RDMA over Converged Ethernet (RoCE), Peripheral Component Interconnect express (PCIe), Intel® QuickPath Interconnect (QPI), Intel® Ultra Path Interconnect (UPI), Intel® On-Chip System Fabric (IOSF), Omnipath, Compute Express Link (CXL), HyperTransport, NVLink, Advanced Microcontroller Bus Architecture (AMBA) interconnect, OpenCAPI, Gen-Z, Cache Coherent Interconnect for Accelerators (CCIX), Infinity Fabric (IF), 3GPP Long Term Evolution (LTE) (4G), 3GPP 5G, and variations thereof. Data can be copied or stored to virtualized storage nodes using a protocol such as NVMe over Fabrics (NVMe-oF) or NVMe.

Embodiments herein may be implemented in various types of computing and networking equipment, such as switches, routers, racks, and blade servers such as those employed in a data center and/or server farm environment. The servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet. For example, cloud hosting facilities may typically employ large data centers with a multitude of servers. A blade comprises a separate computing platform that is configured to perform server-type functions, that is, a "server on a card." Accordingly, a blade includes components common to conventional servers, including a main printed circuit board (main board) providing internal wiring (e.g., buses) for coupling appropriate integrated circuits (ICs) and other components mounted to the board.

Figure 8:
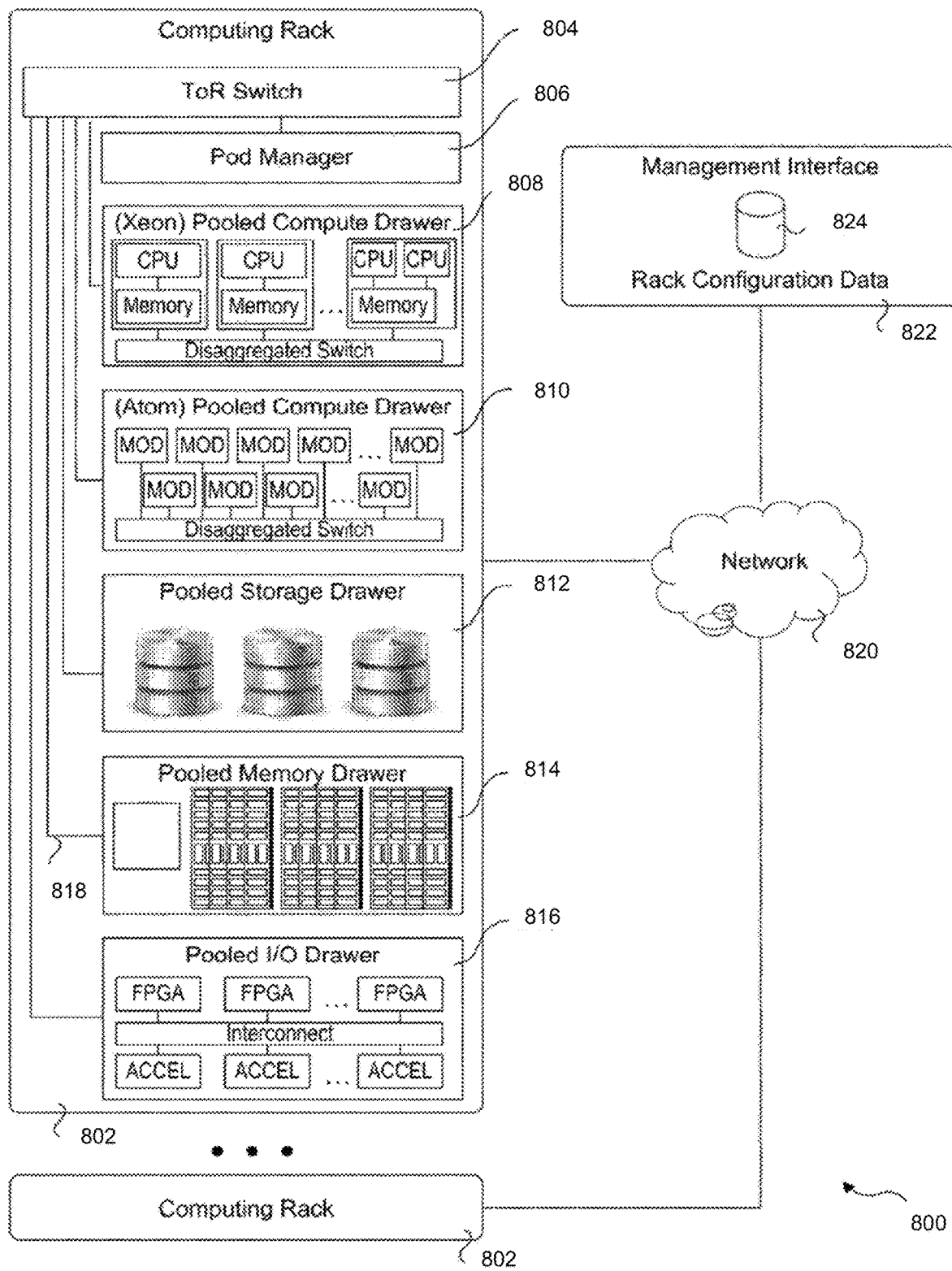
FIG. 8 depicts an example environment, in accordance with one or more aspects of the embodiments described herein.

FIG. 8 depicts an environment 800 includes multiple computing racks 802, one or more including a Top of Rack (ToR) switch 804, a pod manager 806, and a plurality of pooled system drawers. Various embodiments can be used to provide processors with access to memory devices using one or more memory hubs. Generally, the pooled system drawers may include pooled compute drawers and pooled storage drawers. Optionally, the pooled system drawers may also include pooled memory drawers and pooled Input/Output (I/O) drawers. In the illustrated embodiment the pooled system drawers include an Intel® XEON® pooled computer drawer 808, and Intel® ATOM™ pooled compute drawer 810, a pooled storage drawer 812, a pooled memory drawer 814, and a pooled I/O drawer 816. Any of the pooled system drawers is connected to ToR switch 804 via a high-speed link 818, such as an Ethernet link or a Silicon Photonics (SiPh) optical link.

Multiple of the computing racks 802 may be interconnected via their ToR switches 804 (e.g., to a pod-level switch or data center switch), as illustrated by connections to a network 820. In some embodiments, groups of computing racks 802 are managed as separate pods via pod manager(s) 806. In one embodiment, a single pod manager is used to manage the racks in the pod. Alternatively, distributed pod managers may be used for pod management operations.

Environment 800 further includes a management interface 822 that is used to manage various aspects of the environment. This includes managing rack configuration, with corresponding parameters stored as rack configuration data 824.

In some examples, embodiments described herein can be used in connection with a base station (e.g., 3G, 4G, 5G, and so forth), macro base station (e.g., 5G networks), picostation (e.g., an IEEE 802.11 compatible access point), nanostation (e.g., for Point-to-MultiPoint (PtMP) applications), on-premises data centers, off-premises data centers, edge network elements, fog network elements, and/or hybrid data centers (e.g., data center that use virtualization, cloud and software-defined networking to deliver application workloads across physical data centers and distributed multi-cloud environments).

For example, various embodiments can be used for wired or wireless protocols (e.g., 3GPP Long Term Evolution (LTE) (4G) or 3GPP 5G), on-premises data centers, off-premises data centers, base station devices, sensor data sender or receiver devices (e.g., for autonomous vehicles or augmented reality applications), endpoint devices, servers, routers, edge network elements (computing elements provided physically closer to a base station or network access point than a data center), fog network elements (computing elements provided physically closer to a base station or network access point than a data center but further from an edge network), and/or hybrid data centers (e.g., data center that use virtualization, cloud and software-defined networking to deliver application workloads across physical data centers and distributed multi-cloud environments). Network or computing elements can be used in local area network (LAN), metropolitan area network (MAN), network with devices connected using optical fiber links, campus area network (CAN), or wide area network (WAN).

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation. A processor can be one or more combination of a hardware state machine, digital control logic, central processing unit, or any hardware, firmware and/or software elements.

Some examples may be implemented using an apparatus or a system. Some examples may be implemented using or as an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

The appearances of the phrase "one example" or "an example" are not necessarily all referring to the same example or embodiment. Any aspect described herein can be combined with any other aspect or similar aspect described herein, regardless of whether the aspects are described with respect to the same figure or element. Division, omission or inclusion of block functions depicted in the accompanying figures does not infer that the hardware components, circuits, software and/or elements for implementing these functions would necessarily be divided, omitted, or included in embodiments.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events. Other sequences of steps may also be performed according to alternative embodiments. Furthermore, additional steps may be added or removed depending on the particular applications. Any combination of changes can be used and one of ordinary skill in the art with the benefit of this disclosure would understand the many variations, modifications, and alternative embodiments thereof.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments utilize at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z.'"

Illustrative examples of the devices, systems, and methods disclosed herein are provided below. An embodiment of the devices, systems, and methods may include any one or more, and any combination of, the examples described below.

Example 1 includes an apparatus for network layer 7 (L7) offload to an infrastructure processing unit (IPU) for a service mesh, where the apparatus comprises an infrastructure processing unit (IPU) comprising: an IPU memory to store a routing table for a service mesh, the routing table to map shared memory address spaces of the IPU and a host device executing one or more microservices, wherein the service mesh provides an infrastructure layer for the one or more microservices executing on the host device; and one or more IPU cores communicably coupled to the IPU memory, the one or more IPU cores to: host a network layer 7 (L7) proxy endpoint for the service mesh; and communicate messages between the network L7 proxy endpoint and an L7 interface device of the one or more microservices by copying data between the shared memory address spaces of the IPU and the host device based on the routing table.

In Example 2, the subject matter of Example 1 can optionally include wherein the network L7 proxy endpoint is to offload ingress proxy and sidecar proxy operations of the service mesh to the IPU. In Example 3, the subject matter of any one of Examples 1-2 can optionally include wherein the host device comprises one or more host central processing units (CPUs).

In Example 4, the subject matter of any one of Examples 1-3 can optionally include wherein the routing table comprises mappings of universal unique identifiers (UUIDs) of the one or more microservices, card addresses of the one or more microservices, and card ports of the one or more microservices. In Example 5, the subject matter of any one of Examples 1-4 can optionally include wherein copying data between the shared memory address spaces utilizes a compute express link (CXL) interconnection for direct memory access (DMA).

In Example 6, the subject matter of any one of Examples 1-5 can optionally include comprising a connector between the IPU and the host device, wherein the connector comprises one or more of: a board trace, an electrical link, an optical link, or a coaxial cable. In Example 7, the subject matter of any one of Examples 1-6 can optionally include wherein the one or more IPU cores are further to packetize the data received from the host device by generating one or more headers for the data to be utilized as part of network packet to transmit over a network interface of the IPU.

In Example 8, the subject matter of any one of Examples 1-7 can optionally include the one or more IPU cores are further to apply routing rules generated using a programmable language to packetize the data into a network packet. In Example 9, the subject matter of any one of Examples 1-8 can optionally include further comprising a server, wherein the server comprises the IPU, and wherein the host device comprises an XPU to execute the one or more microservices that cause issuance of a network access request to the network L7 endpoint of the IPU.

Example 10 is a method for facilitating network layer 7 (L7) offload to an infrastructure processing unit (IPU) for a service mesh. The method of Example 10 can include storing, by a programmable network device, a routing table for a service mesh, the routing table to map shared memory address spaces of the programmable network device and a host device executing one or more microservices, wherein the service mesh provides an infrastructure layer for the one or more microservices executing on the host device; hosting, by the programmable network device, a network layer 7 (L7) proxy endpoint for the service mesh; and communicating, by the programmable network device, messages between the network L7 proxy endpoint and an L7 interface device of the one or more microservices by copying data between the shared memory address spaces of the programmable network device and the host device based on the routing table.

In Example 11, the subject matter of Example 10 can optionally include wherein the network L7 proxy endpoint is to offload ingress proxy and sidecar proxy operations of the service mesh to the programmable network device. In Example 12, the subject matter of Examples 10-11 can optionally include wherein the routing table comprises mappings of universal unique identifiers (UUIDs) of the one or more microservices, card addresses of the one or more microservices, and card ports of the one or more microservices.

In Example 13, the subject matter of Examples 10-12 can optionally include wherein copying data between the shared memory address spaces utilizes a compute express link (CXL) interconnection for direct memory access (DMA). In Example 14, the subject matter of Examples 10-13 can optionally include further comprising packetizing the data received from the host device by generating one or more headers for the data to be utilized as part of network packet to transmit over a network interface of the programmable network device. In Example 15, the subject matter of Examples 10-14 can optionally include further comprising applying routing rules generated using a programmable language to packetize the data into a network packet.

In Example 16, the subject matter of Examples 10-15 can optionally include wherein a server comprises the programmable network device comprising at least one of an infrastructure processing unit (IPU), data processing unit (DPU), or Smart Network Interface Card (SmartNIC), and wherein the host device comprises an XPU to execute an application or microservice that causes issuance of a network access request to the network L7 endpoint of the programmable network device.

Example 17 is a non-transitory computer-readable storage medium for facilitating network layer 7 (L7) offload to an infrastructure processing unit (IPU) for a service mesh. The non-transitory computer-readable storage medium of Example 17 comprising instructions stored thereon, that if executed by one or more processors, cause the one or more processors to: store, by an infrastructure processing unit (IPU) of the one or more processors, a routing table for a service mesh, the routing table to map shared memory address spaces of the IPU and a host device executing one or more microservices, wherein the service mesh provides an infrastructure layer for the one or more microservices executing on the host device; host, by the IPU, a network layer 7 (L7) proxy endpoint for the service mesh; and communicate, by the IPU, messages between the network L7 proxy endpoint and an L7 interface device of the one or more microservices by copying data between the shared memory address spaces of the IPU and the host device based on the routing table.

In Example 18, the subject matter of Example 17 can optionally include wherein the network L7 proxy endpoint is to offload ingress proxy and sidecar proxy operations of the service mesh to the IPU. In Example 19, the subject matter of Examples 17-18 can optionally include wherein the one or more processors further to packetize the data received from the host device by generating one or more headers for the data to be utilized as part of network packet to transmit over a network interface of the IPU.

In Example 20, the subject matter of Examples 17-19 can optionally include wherein the one or more processors further to apply routing rules generated using a programmable language to packetize the data into a network packet.

Example 21 is a system for facilitating network layer 7 (L7) offload to an infrastructure processing unit (IPU) for a service mesh. The system of Example 21 can optionally include a plurality of XPUs, and an infrastructure processing unit (IPU) communicably coupled to the plurality of XPUs, the IPU comprising: an IPU memory to store a routing table for a service mesh, the routing table to map shared memory address spaces of the IPU and a host device executing one or more microservices, wherein the service mesh provides an infrastructure layer for the one or more microservices executing on the host device; and one or more IPU cores communicably coupled to the IPU memory, the one or more IPU cores to: host a network layer 7 (L7) proxy endpoint for the service mesh; and communicate messages between the network L7 proxy endpoint and an L7 interface device of the one or more microservices by copying data between the shared memory address spaces of the IPU and the host device based on the routing table.

In Example 22, the subject matter of Example 21 can optionally include wherein the network L7 proxy endpoint is to offload ingress proxy and sidecar proxy operations of the service mesh to the IPU. In Example 23, the subject matter of any one of Examples 21-22 can optionally include wherein the host device comprises one or more host central processing units (CPUs).

In Example 24, the subject matter of any one of Examples 21-23 can optionally include wherein the routing table comprises mappings of universal unique identifiers (UUIDs) of the one or more microservices, card addresses of the one or more microservices, and card ports of the one or more microservices. In Example 25, the subject matter of any one of Examples 21-24 can optionally include wherein copying data between the shared memory address spaces utilizes a compute express link (CXL) interconnection for direct memory access (DMA).

In Example 26, the subject matter of any one of Examples 21-25 can optionally include comprising a connector between the IPU and the host device, wherein the connector comprises one or more of: a board trace, an electrical link, an optical link, or a coaxial cable. In Example 27, the subject matter of any one of Examples 21-26 can optionally include wherein the one or more IPU cores are further to packetize the data received from the host device by generating one or more headers for the data to be utilized as part of network packet to transmit over a network interface of the IPU.

In Example 28, the subject matter of any one of Examples 21-27 can optionally include the one or more IPU cores are further to apply routing rules generated using a programmable language to packetize the data into a network packet. In Example 29, the subject matter of any one of Examples 21-28 can optionally include further comprising a server, wherein the server comprises the IPU, and wherein the host device comprises an XPU to execute the one or more microservices that cause issuance of a network access request to the network L7 endpoint of the IPU.

Example 30 is an apparatus for facilitating network layer 7 (L7) offload to an infrastructure processing unit (IPU) for a service mesh, comprising means for storing, using a programmable network device, a routing table for a service mesh, the routing table to map shared memory address spaces of the programmable network device and a host device executing one or more microservices, wherein the service mesh provides an infrastructure layer for the one or more microservices executing on the host device; means for hosting, using the programmable network device, a network layer 7 (L7) proxy endpoint for the service mesh; and means for communicating, using the programmable network device, messages between the network L7 proxy endpoint and an L7 interface device of the one or more microservices by copying data between the shared memory address spaces of the programmable network device and the host device based on the routing table. In Example 31, the subject matter of Example 30 can optionally include the apparatus further configured to perform the method of any one of the Examples 11 to 16.

Example 32 is at least one machine readable medium comprising a plurality of instructions that in response to being executed on a computing device, cause the computing device to carry out a method according to any one of Examples 10-16. Example 33 is an apparatus for facilitating network layer 7 (L7) offload to an infrastructure processing unit (IPU) for a service mesh, configured to perform the method of any one of Examples 10-16. Example 34 is an apparatus for facilitating network layer 7 (L7) offload to an infrastructure processing unit (IPU) for a service mesh, comprising means for performing the method of any one of claims 10 to 16. Specifics in the Examples may be used anywhere in one or more embodiments.

The foregoing description and drawings are to be regarded in an illustrative rather than a restrictive sense. Persons skilled in the art can understand that various modifications and changes may be made to the embodiments described herein without departing from the broader spirit and scope of the features set forth in the appended claims.

What is claimed is:

1. An apparatus comprising:
an infrastructure processing unit (IPU) comprising:
an IPU memory to store a routing table for a service mesh, the routing table to map shared memory address spaces of the IPU and a host device executing one or more microservices, wherein the service mesh provides an infrastructure layer for the one or more microservices executing on the host device; and
one or more IPU cores communicably coupled to the IPU memory, the one or more IPU cores to:
host a network layer 7 (L7) proxy endpoint for the service mesh; and
communicate messages between the network L7 proxy endpoint and an L7 interface device of the one or more microservices by copying data between the shared memory address spaces of the IPU and the host device based on the routing table.

2. The apparatus of claim 1, wherein the network L7 proxy endpoint is to offload ingress proxy and sidecar proxy operations of the service mesh to the IPU.

3. The apparatus of claim 1, wherein the host device comprises one or more host central processing units (CPUs).

4. The apparatus of claim 1, wherein the routing table comprises mappings of universal unique identifiers (UUIDs) of the one or more microservices, card addresses of the one or more microservices, and card ports of the one or more microservices.

5. The apparatus of claim 1, wherein copying data between the shared memory address spaces utilizes a compute express link (CXL) interconnection for direct memory access (DMA).

6. The apparatus of claim 1, further comprising a connector between the IPU and the host device, wherein the connector comprises one or more of: a board trace, an electrical link, an optical link, or a coaxial cable.

7. The apparatus of claim 1, wherein the one or more IPU cores are further to packetize the data received from the host device by generating one or more headers for the data to be utilized as part of network packet to transmit over a network interface of the IPU.

8. The apparatus of claim 7, wherein the one or more IPU cores are further to apply routing rules generated using a programmable language to packetize the data into a network packet.

9. The apparatus of claim 1, further comprising a server, wherein the server comprises the IPU, and wherein the host device comprises an XPU to execute the one or more microservices that cause issuance of a network access request to the network L7 endpoint of the IPU.

10. A method comprising:
storing, by a programmable network device, a routing table for a service mesh, the routing table to map shared memory address spaces of the programmable network device and a host device executing one or more microservices, wherein the service mesh provides an infrastructure layer for the one or more microservices executing on the host device;
hosting, by the programmable network device, a network layer 7 (L7) proxy endpoint for the service mesh; and
communicating, by the programmable network device, messages between the network L7 proxy endpoint and an L7 interface device of the one or more microservices by copying data between the shared memory address spaces of the programmable network device and the host device based on the routing table.

11. The method of claim 10, wherein the network L7 proxy endpoint is to offload ingress proxy and sidecar proxy operations of the service mesh to the programmable network device.

12. The method of claim 10, wherein the routing table comprises mappings of universal unique identifiers (UUIDs) of the one or more microservices, card addresses of the one or more microservices, and card ports of the one or more microservices.

13. The method of claim 10, wherein copying data between the shared memory address spaces utilizes a compute express link (CXL) interconnection for direct memory access (DMA).

14. The method of claim 10, further comprising packetizing the data received from the host device by generating one or more headers for the data to be utilized as part of network packet to transmit over a network interface of the programmable network device.

15. The method of claim 14, further comprising applying routing rules generated using a programmable language to packetize the data into a network packet.

16. The method of claim 10, wherein a server comprises the programmable network device comprising at least one of an infrastructure processing unit (IPU), data processing unit (DPU), or Smart Network Interface Card (SmartNIC), and wherein the host device comprises an XPU to execute an application or microservice that causes issuance of a network access request to the network L7 endpoint of the programmable network device.

17. A non-transitory computer-readable medium, comprising instructions stored thereon, that if executed by one or more processors, cause the one or more processors to:
store, by an infrastructure processing unit (IPU) of the one or more processors, a routing table for a service mesh, the routing table to map shared memory address spaces of the IPU and a host device executing one or more microservices, wherein the service mesh provides an infrastructure layer for the one or more microservices executing on the host device;
host, by the IPU, a network layer 7 (L7) proxy endpoint for the service mesh; and
communicate, by the IPU, messages between the network L7 proxy endpoint and an L7 interface device of the one or more microservices by copying data between the shared memory address spaces of the IPU and the host device based on the routing table.

18. The non-transitory computer-readable medium of claim 17, wherein the network L7 proxy endpoint is to offload ingress proxy and sidecar proxy operations of the service mesh to the IPU.

19. The non-transitory computer-readable medium of claim 17, wherein the one or more processors further to packetize the data received from the host device by generating one or more headers for the data to be utilized as part of network packet to transmit over a network interface of the IPU.

20. The non-transitory computer-readable medium of claim 19, wherein the one or more processors further to apply routing rules generated using a programmable language to packetize the data into a network packet.

* * * * *